(12) United States Patent
Kammerzell et al.

(10) Patent No.: US 7,131,639 B2
(45) Date of Patent: Nov. 7, 2006

(54) WATER DISTRIBUTION SYSTEM FOR AN EVAPORATIVE COOLER

(76) Inventors: Donald L. Kammerzell, 15638 N. 41st Pl., Phoenix, AZ (US) 85032; Charles Russo, 6252 N. 16th Ave., Phoenix, AZ (US) 85015; Larry Lee Kammerzell, 1806 Empire, Loveland, CO (US) 80538

( * ) Notice: Subject to any disclaimer, the term of this patent is extended or adjusted under 35 U.S.C. 154(b) by 386 days.

(21) Appl. No.: 10/862,040

(22) Filed: Jun. 4, 2004
(Under 37 CFR 1.47)

(65) Prior Publication Data

US 2005/0012230 A1  Jan. 20, 2005

Related U.S. Application Data

(60) Provisional application No. 60/509,001, filed on Oct. 6, 2003, provisional application No. 60/476,095, filed on Jun. 5, 2003.

(51) Int. Cl.
*B01F 3/04* (2006.01)
(52) U.S. Cl. .................... 261/96; 261/98; 261/99; 261/106; 261/107
(58) Field of Classification Search ............. 261/28, 261/29, 66, 69.1, 96–99, 102–107, 128–131
See application file for complete search history.

(56) References Cited

U.S. PATENT DOCUMENTS

| 1,750,047 A | | 3/1930 | Metzger |
| 2,497,947 A | | 2/1950 | Lewis |
| 3,262,682 A | | 7/1966 | Bredberg |
| 3,353,802 A | * | 11/1967 | Greer .................. 261/110 |
| 3,788,542 A | | 1/1974 | Mee ..................... 239/2 R |
| 3,958,959 A | | 5/1976 | Choen et al. ............ 55/10 |
| 4,031,180 A | | 6/1977 | Bohanon ............... 261/106 |
| 4,215,079 A | | 7/1980 | Christophersen et al. . 261/36 R |
| 4,310,476 A | | 1/1982 | Nahra et al. ............ 261/118 |
| 4,441,557 A | | 4/1984 | Zublin .................. 166/312 |

(Continued)

OTHER PUBLICATIONS

Hays Fluid Controls, MesurFlo Automatic Balancing Valve, Flyer 10000452 Rev 03.

*Primary Examiner*—Scott Bushey
(74) *Attorney, Agent, or Firm*—Cahill, von Hellens & Glazer P.L.C.

(57) ABSTRACT

An evaporative cooler, including one or more media modules, distributes water from a source of water to each module through a constant flow valve. A distribution unit at each media module includes a spray bar for spraying water through a plurality of uniformly spaced holes having an aggregate area equivalent to or less than twenty five percent (25%) of the internal cross sectional area of the spray bar. A distribution cap distributes the streams of water to the underlying media module(s) and the water dripping from the media module(s) is drained. A fan or other air moving device draws air through the media module(s) to obtain cooled air resulting from evaporation of water flowing downwardly along the media module(s). A microprocessor controller, responsive to any of one or more sensors for sensing the temperature of the air flowing into and out of the media module(s), the relative humidity of the air flowing into and out of the media module(s), the pressure differential between the upstream and downstream sides of the media module(s), the temperature of the water flowing to the spray bar(s), the fan speed, and the pressure differential between the downstream side of the media module(s) and the downstream side of the fan, controls the flow of water and the fan speed.

30 Claims, 10 Drawing Sheets

U.S. PATENT DOCUMENTS

| | | | | |
|---|---|---|---|---|
| 4,752,419 A | * | 6/1988 | Sperr, Jr. et al. | 261/29 |
| 4,933,117 A | | 6/1990 | Wilson | 261/99 |
| 4,953,831 A | | 9/1990 | Albrecht | 261/102 |
| 5,130,063 A | * | 7/1992 | Collins et al. | 261/106 |
| 5,606,868 A | | 3/1997 | Calvert | 62/315 |
| 5,966,953 A | | 10/1999 | Murr et al. | 62/171 |
| 5,971,370 A | * | 10/1999 | Galabinski | 261/97 |
| 6,206,348 B1 | * | 3/2001 | Imsdahl et al. | 261/95 |
| 6,311,712 B1 | | 11/2001 | Meyer | 137/8 |
| 6,367,277 B1 | | 4/2002 | Kinkel | 62/310 |
| 6,378,322 B1 | | 4/2002 | Calvert | 62/314 |
| 6,390,122 B1 | | 5/2002 | Zhang et al. | 137/517 |
| 6,595,235 B1 | | 7/2003 | Zhang | 137/270 |
| 6,966,364 B1 | * | 11/2005 | Babikian et al. | 165/228 |
| 2003/0001294 A1 | * | 1/2003 | Permenter | 261/97 |

* cited by examiner

LEGEND

Constants

| | |
|---|---|
| Media | type of evaporative media and evaporation effeciency |
| Media dim | Physical dimensions of the media (H x W x D) and effective face area |
| Installed elevation | Installed altitude above sea level |
| Installed air volumes | Measured air volume rate through ECM |
| Number of ECMs | number of ECMs in unit |
| Water Quality data | water hardness |
| Digitized Fan curve | |

Variables

| | |
|---|---|
| Start | Start switch engaged |
| Stop | Stop switch engaged |
| Ti | Gas Temperature inlet |
| To | Gas Temperature outlet |
| Twi | Water Temperature inlet |
| Two | Water Temperature outlet |
| Rhi | Gas Relative Humidity inlet |
| Rho | Gas Relative Hunidity outlet |
| Mdp | Media Differential Pressure |
| Sdp | System Differential Pressure |
| Fs | Fan Speed (motor speed) |

CALculated variables

| | |
|---|---|
| We | Water Theoretical Evaporation Rate |
| Wc | Water Chemistry Carry Rate |
| Wt | Water Transport Rate |
| Wr | Water Rinse Rate |
| G | Media Geometry modifyer |
| On | Cycle time for water on |
| Off | Cycle time for water off |
| Dry | Cycle time for media to dry with air flow. |
| SAT | Cycle time for media to saturate without air flow. |

MULTIPLE ECM PANEL

FIG. 10A

⬡ D -DRAIN
☐ I - WATER INLET ECM
Ⓣi - AIR TEMP OUTLET
Ⓣox - AIR TEMP OUTLET ECMX

FIG. 10B

WATER DISTRIBUTION SYSTEM FOR AN EVAPORATIVE COOLER

CROSS REFERENCE TO RELATED APPLICATIONS

The present application includes subject matter disclosed in and claims priority to a provisional application entitled "Evaporative Cooler Control Apparatus and Method", filed Jun. 5, 2003 and assigned Ser. No. 60/476,095 describing an invention made by the present inventors. This application also relates to subject matter described in and claims priority to a provisional application entitled "Water Distribution System for Evaporative Cooler", filed Oct. 6, 2003 and assigned Ser. No. 60/509,001 describing an invention made by the present inventors.

BACKGROUND OF THE INVENTION

1. Field of the Invention

The present invention relates to water distribution systems for evaporative coolers and, more particularly, to a water distribution system for controlling distribution of water uniformly across a media to avoid dry spots, scaling, streaking and distribution of excess water.

2. Description of Related Art

Evaporative cooling appears to be a simple process of passing hot dry air through a wet pad or media to evaporate the water with the latent heat of the air and inherently the air becomes cooler and more humid. In reality, there are three complex mechanical and chemical processes taking place in an evaporative cooler. The first process is the air system which is controlled by the pyschrometric chart and the efficiency of the media. The second process is the water delivery system that has to ensure that the media has sufficient water for evaporation and that the media is uniformly wetted. The third process is the water chemistry system where the water for evaporation is controlled so that the naturally occurring dissolved solids in the water remain in solution and are disposed of prior to being deposited on the media. Almost all evaporative coolers built to date have made only first order approximations for one or more of the processes and have either ignored or been unaware of the others.

The air around us is essentially a constant composition of gases (nitrogen, oxygen, carbon dioxide and others) and varying amounts of water vapor. It also contains solid impurities such as dust and organic material, which will be ignored in the following discussion. The gas component of air behaves in accordance with Boyle's and Charles' laws, i.e. the volume of the gas varies inversely with the absolute pressure and directly with the absolute temperature, respectively. The water vapor portion of air does not behave as a perfect gas. The amount of moisture in the air is dependant on the amount of moisture available and is limited to a maximum saturation value based on the air temperature and pressure. As moisture is added to or removed from the air, water is either evaporated or condensed. This change in phase captures or releases energy. In evaporative cooling applications, the evaporation of water absorbs heat. The movement of the heat from the air to the water vapor happens without a change in air volume or air pressure and results in a lowering of the temperature of the air. The relationships between pressure, temperature, humidity, density and heat content are most commonly shown graphically on pyschrometric charts. These relationships are very well defined and have been the subject of extensive research.

Applying the pyschrometric chart to the evaporative cooling process is easy for any one particular set of operating conditions. If one knows the entering air temperature (inlet dry bulb), the relative humidity of the inlet air, the barometric pressure and the volume of air being cooled one can calculate the theoretical amount of moisture that can be evaporated into the airstream and the resulting temperature reduction.

Actual operating conditions change constantly. The inlet air temperature, the relative humidity and barometric pressure are the detailed measurements of what is generally referred to as the "Weather". Most evaporative cooler manufacturers design their equipment to handle a specific air flow rate at standard conditions and size the evaporation media for this flow rate. The efficiency of the evaporative cooler is determined by the air flow rate over the chosen media. Each media type has physical characteristics that determine how fast and thoroughly the water can be evaporated into the airstream. The most common evaporative cooling media in use today is a corrugated kraft type paper. The market leader in this type of media is Munters Corp. which markets its media under the brand names Cel Dek and Glacier-Cor. Depending on the thickness of the media used and the velocity of the air flowing through the media, the saturation effectiveness (efficiency) can range from less than 60% to about 98 or 99%.

The majority of existing evaporative coolers are controlled by a downstream thermostat and the evaporative coolers are either on or off. The efficiency of the evaporative cooler changes with the weather and the water system pressure. The conventional evaporative cooler does not attempt to control any of these process variables to optimize efficiency.

To obtain maximum evaporation, the media must be adequately wetted. Most conventional evaporative coolers have a large basin or sump filled with water that is pumped to a perforated header pipe at the top of the media. The water is sprayed from the header pipe up to a deflector shield and runs down onto the top of the media. Excess water is applied to ensure saturation of the media. The water not evaporated drains into the sump to be reused. All recirculating evaporative cooler manufacturers recommend that a portion of the recirculating water be discarded and replaced with fresh water added to the sump to keep the water quality at a minimum quality level.

The media removes significant amounts of airborne contaminants from the air as it passes through the media and the return water rinses a portion of the contaminants off the media and carries them to the sump. In addition, naturally occurring salts in the water supply become concentrated on the surface of the media and are partially rinsed into the sump. While some of these contaminants and precipitated salts settle to the bottom of the sump, a significant amount are entrained at the pump inlet and are recirculated back onto the media.

The pumps used in most recirculating type evaporative coolers are submersible centrifugal pumps. These inexpensive pumps are not precision pieces of equipment when new and wear quickly as the debris is recirculated. This deterioration of the pump leads to fairly rapid changes in the delivery head for the pump. This change in the output of the pump renders it difficult to regulate the water flow across the media. The distribution header pipe uses large holes on relatively large hole spacing to minimize debris fouling and plugging. The end result is an uneven water distribution and occasionally dry strips on the media. Constant maintenance is required to adjust and maintain an adequate supply of water for the media. Often, these systems attempt to cure uneven water flow by pumping an excess amount of water to the media. This excess amount of water can cause the cellulose media to deteriorate prematurely with associated poor performance and costly early media replacement.

The most overlooked aspect of evaporative cooling is controlling the concentration of dissolved solids in the water being evaporated on the media. The water supply for evaporative coolers is typically domestic water which contains a number of compounds as dissolved solids. Water is evaporated by the warm air leaving behind all of the dissolved solids in a small volume of water on the media. Each type of dissolved solids has a solubility limit. That is, when the concentration of a particular compound reaches a known concentration, the compound precipitates out. In evaporative coolers the most common form of precipitate is calcium carbonate scale on the media. This hard water scale does not re-dissolve when rewetted. Once formed on the media it reduces the saturation efficiency and clogs the water distribution channels.

Recirculating evaporative coolers reapply the sump water to the media. Each time the water is applied, some of it evaporates and the dissolved solids build up in the water. All evaporative cooler manufacturers either bleed some of the recirculating water off to try and reduce the concentration of the dissolved solids (called cycles of concentration in the industry) or dump the sump water occasionally to eliminate as much of the dissolved solids as possible. Most sumps have a float actuated make up valve to add water to the sump. This mixes the fresh water with the concentrated dissolved solids in the water and reduces the concentration. As a practical matter, however, the resulting water being distributed on the media will always have higher levels of dissolved solids than the inlet water.

If the water distribution system allows the water in any area to become too concentrated with dissolved solids before it leaves the media, the media will start to scale. Once scaling begins, the process threshold for additional scaling is reduced such that the salt crystals will grow whenever the water surrounding them is just near the precipitation point.

Effectively controlling the build up of scale through deployment of a feed and bleed process requires more control equipment and is currently supplied with such systems. To date, a clear solution is that of eliminating a recirculating system in favor of a single water pass system. The single pass systems provide water to the top of the media and let it flow through the media and the flow therefrom is drained. Several challenges must be overcome to implement such a system. First, one must incorporate on/off controls to regulate the water introduced to the media. Second, the flow volume of water must be sufficient to wet the media completely and yet the flow must be periodically shut off to avoid wasting large amounts of water. Some existing systems use a timer based controller to regulate the water flow. Another type of system uses a single temperature sensor within the media coupled with a timer to control the flow of water. These systems typically fail prematurely either from using too much water or from using an insufficient amount of water resulting in drying out and scaling of the media. Neither of these two types of systems are widely commercially acceptable.

In general, the evaporative cooler market has become a commodity market, with market conditions forcing the manufacturers to produce less expensive coolers. Without clear standards on how to rate the units and a consumer base untrained in the art of evaporative cooling will not recognize the consequences of the current industry practice to rate evaporative coolers at a nominal air flow rate without reference to the efficiency of the unit. As a result, the consumer makes his decision primarily on cost rather than performance or return on investment.

Various prior art evaporative cooler systems are described in the patents listed below.

U.S. Pat. No. 4,968,457 describes a non circulating control for an evaporative cooler. The water flow is metered by a simple solenoid valve which does not take into consideration change in flow rate as a function of inlet line pressure. Therefore, the amount of water delivered at different times of the day will vary with changes in domestic water line pressure. Furthermore, there is no understanding of the need for a change of water flow rates as a function of the hardness of the inlet water nor is there a discussion of providing more water than is evaporated to keep the media from scaling. A sensor for controlling operation of a solenoid valve is placed downstream of spray nozzles ejecting water to the media to sense the temperature or the humidity. There is no understanding that the cooling process is primarily dependant on the inlet air conditions.

U.S. Pat. No. 5,775,580 is directed to a non circulating evaporative cooler for primarily eliminating the dripping of water from the media. This will result in at least a part of the media becoming dry with resulting deposit of salts and compromise of the integrity of the media and its effectiveness unless pure water is used.

U.S. Pat. No. 6,367,277 discloses the use of fresh water makeup to minimize scaling in a recirculating evaporative cooler system. There is no disclosure relating to controlling the hardness of the water at the point of evaporation on the media nor does this system minimize the amount of water used. It also requires bleed of a substantial amount of the recirculating water to keep the minerals from precipitating out. No understanding of the varying conditions from location to location and the effect thereof on the efficiency of the evaporative cooler is set forth.

There are several types of problems associated with heavy scale formation on the media in an evaporative cooler where evaporative cooling occurs. First, there is a decreased air flow through the media because the air channels therewithin become more or less plugged. To maintain an adequate air volume, the velocity of the air through the media must increase. At speeds above 650 feet per minute, there is a tendency for small droplets of water to become entrained in the airstream unless other steps are taken. These droplets may super saturate the airstream to the point that moisture may condense downstream of the media and create other problems unacceptable to the user. Second, at localized concentrations of salts, the pH in those areas increases dramatically. The high pH will allow the water to leach the resin and delignify the cellulose in the media and cause premature structural failure of the media.

Indoor air quality has become a growing concern as modern office and industrial buildings become more energy efficient and better insulated. Various regulations cover how much fresh outside air must be introduced into the HVAC system in a building. This outside air is rarely at the desired temperature and relative humidity. In the southwest of the United States, the air is generally much dryer and hotter then desired. This means that the makeup air requires cooling and humidification before it can be introduced into the building. Conventional chilled water systems in large commercial buildings use a combination of cooling towers and mechanical chillers to supply the cooling for the building. These systems use considerable electricity to operate. Direct evaporative cooling has been used to reduce this electrical demand by cooling the makeup air during its introduction into the building. These applications have been plagued by the same scaling and lack of control problems described above.

Evaporative cooling is often used in dusty industrial environments. Historically, recirculating evaporative coolers become plugged with dust. Often pre-filters are installed upstream of the evaporative cooler to remove the dust present in the air. Poor maintenance often resulted in filter overloading, filter failure and media plugging. One approach to this problem of dust has been that of using an excess water flow controlled by only a timer for dust control. These results were not particularly successful. A further unit uses a fresh water makeup header to try to control the dust buildup with a timer to activate the flush. This has not proven to be particularly effective.

SUMMARY OF THE INVENTION

The evaporative cooler having one or more media modules uses a supply of non circulating filtered water to avoid a build up of dissolved impurities. The water is regulated and metered to wet each media module to ensure uniform and controlled water distribution that does not vary more than 4% across the media. When multiple media modules are employed, the variation between modules is less than 5%. A microprocessor receives data reflective of the parameters of the air entering and leaving each media module and generates appropriate control signals to actuate one or more stainless steel ball valves that provide positive control of the water flow to valves able to produce constant flow irrespective of supply water pressure changes. When multiple media modules are present, the water flow between modules varies by less than 10%. The water distribution unit attendant each media module is configured to provide uniform water discharge across the media irrespective of water variations in water pressure. In particular, each water distribution unit includes evenly spaced discharge holes along a manifold defining a total area of 25% or less of the cross section area of the manifold in order to maintain a water discharge rate less than +/−10% along the manifold.

A primary object of the present invention is to provide an evaporative cooler that will not experience scaling, clogging and compromise of the wetted media as it absorbs heat from the air flowing therethrough.

Another object of the present invention is to provide a uniform water distribution pattern across the top of the media of an evaporative cooler, which pattern results in a water distribution in the media consistent with the profile of the heat transfer and therefore consistent with the water evaporation from the media.

Still another object of the present invention is to provide a water flow rate to and across the media of an evaporative cooler as a function of the parameters of the air entering and leaving the media.

Yet another object of the present invention is to provide a constant flow valve for conveying water to the media of an evaporative cooler irrespective of variations in water pressure during periods of use.

Another object of the present invention is to provide ongoing data from sensors reflective of the evaporative cooler environment to generate control signals for a valve regulating the flow of water to the media of an evaporative cooler.

A still further object of the present invention is to provide a water distribution system to each media module of an evaporative cooler that uniformly wets and maintains the media wet.

A yet further object of the present invention is to provide a water distribution manifold at the top of the media of an evaporative cooler that distributes a uniform flow of water along the length of the manifold irrespective of changes in water pressure to the manifold.

A still further object of the present invention is to provide a plurality of water distribution manifolds located at the top of the media of an evaporative cooler to provide a uniform flow of water along the length and width of the media and uniformly wet the media.

A yet further object of the present invention is to provide a method for avoiding scaling and clogging of the media of an evaporative cooler.

A yet further object of the present invention is to provide a water distribution system that maintains wetted the media of an evaporative cooler irrespective of changes in pressure of the source of water to the distribution system.

A yet further objective of the present invention is to take advantage of the improved physical behavior of the media as it operates between a fully saturated condition and that reflective of the lower level of saturation associated with a reduced volume of water and dissolved solids at cycles of concentration limits.

These and other objects of the present invention will become apparent to those skilled in the art as the description thereon proceeds.

BRIEF DESCRIPTION OF THE DRAWINGS

The present invention will be described with greater specificity and clarity with reference to the following drawings, in which.

DESCRIPTION OF THE PREFERRED EMBODIMENT

The psychometric chart provides information such that if the inlet dry bulb temperature and the inlet wet bulb temperature are known one can determine the amount of moisture that can be added to the air and the resulting leaving air dry bulb and wet bulb temperatures. This is founded on the law of thermodynamics known as a mass balance equation. These principles characterize operations for given inlet conditions and the capabilities of the equipment. Existing evaporative coolers attempt to control operations by using these principles and measuring the outlet temperature, the pad temperature, and the outlet relative humidity or pad relative humidity. It is a clear given associated with these principles that the physical state of the inlet air drives or is the causal variable that determines the ability to achieve evaporative cooling. At one extreme, if the inlet air is at 100% relative humidity, the evaporative cooler cannot function because additional moisture cannot be evaporated and hence no reduction in temperature of the outlet air can be achieved. There is one combination of measured inlet conditions and operating parameters that yield this measured outlet condition when all appropriate variables are measured. However, failure to measure one of these variables makes this an indeterminate exercise. Measuring the appropriate inlet condition parameters permits calculation of the expected results from an evaporative cooler and this calculation can be compared with the measured results to confirm the correct operation of the evaporative cooler. The problem that has existed in applying these concepts to evaporative coolers is that most control system designs are not able to manage the physical parameters that control the process. The only input parameters attendant most evaporative coolers include a leaving air temperature switch (such as a room thermostat), the area of the wetted media and the nominal air flow. For example, a commercially available unit simply measures the temperature of the outflowing air while another unit measures the inlet air temperature and regulates the on and off time of the water supply as two control points. An important factor that has not been incorporated in existing units relates to accurately and consistently metering the water supplied to the media. Most existing evaporative coolers use ball or controlled orifice valves to control the water supply to the media. These fail to maintain water flow within an acceptable range for non-recirculating systems because the volume of water delivered changes with water pressure in non-circulating systems because of water usage elsewhere and significant pressure changes associated with these other uses within this connected system. For example, the water flow may be consistent with that needed to maintain the evaporative cooler media wet in the morning when the municipal water system has a relatively high pressure but may not provide sufficient flow at midday when the water pressure is typically lower.

Figure 1:
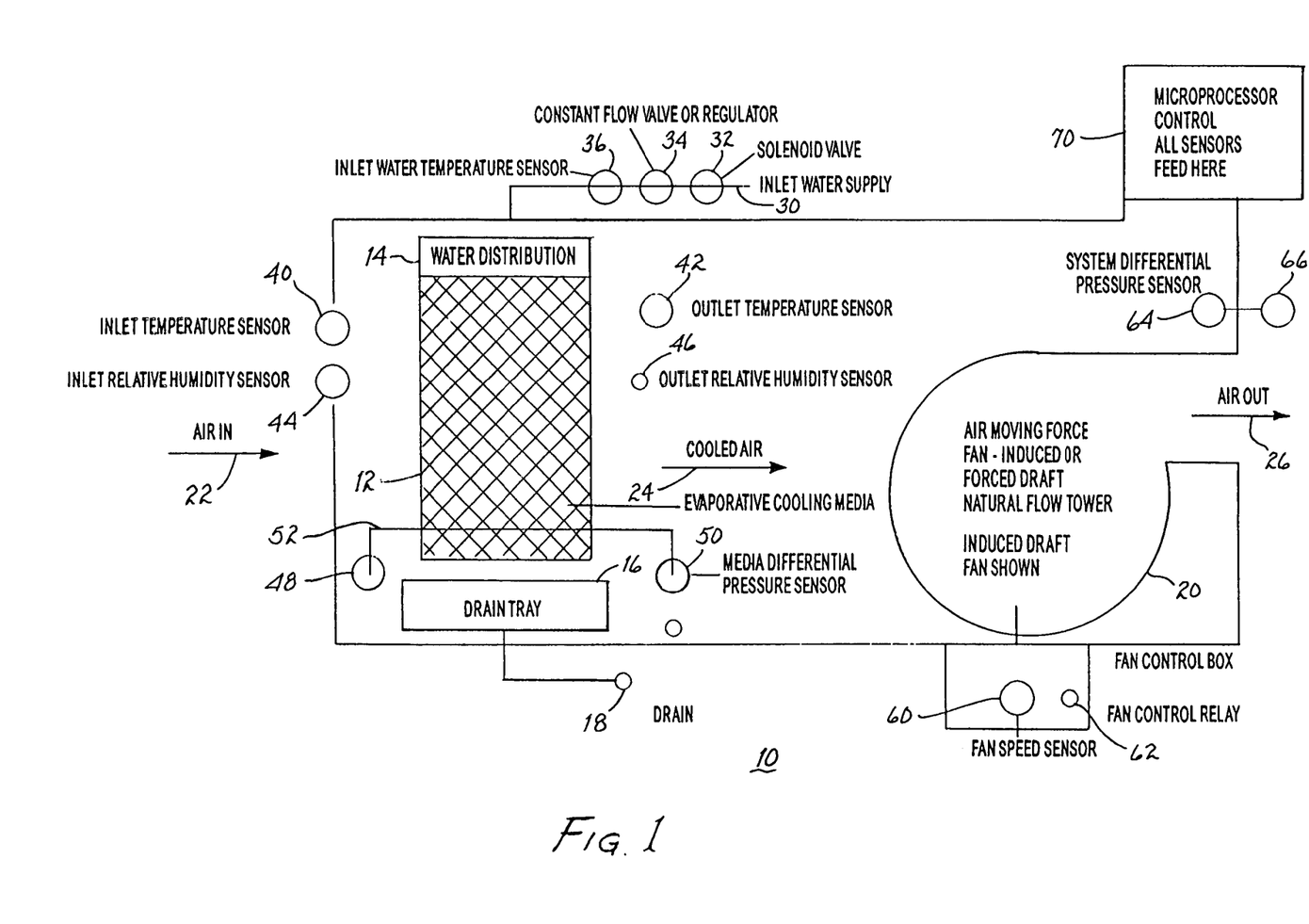
FIG. 1 is a schematic illustrating an evaporative cooler embodying the present invention.

Referring to FIG. 1, there is shown an evaporative cooler system 10 and the control for operating it efficiently while causing minimal deterioration of the operative aspects of the wetted media. The most common media 12 presently in use is of the corrugated Kraft type paper. A typical form of this media is manufactured by Munters Corp. and sold under the Cel Dek and Glacier-Cor trademarks. A water distribution unit 14 is mounted above the media to uniformly distribute water across the top of the media at a sufficient flow rate to maintain the media wetted during operation of the evaporative cooler. Water dripping from the media is collected in drain tray 16 and discarded through a drain 18. The water is not re-circulated; thereby, the problems associated with use of re-circulation systems and evaporative coolers are avoided, including those associated with concentration of dissolved solids in the water used to wet the pads. Air to be cooled is drawn through media 12 by a fan 20. It is to be understood that any of various devices may be employed to cause air flow through the media. The air to be cooled, as represented by arrow 22, is drawn into media 12. As the air passes through the media, it causes evaporation of some of the water present on the media. Such evaporation draws heat from the air and the cooler air is exhausted from the media, as represented by arrow 24. This cooled air is drawn into the fan and then discharged, as represented by arrow 26, into the environment to be cooled. An inlet water supply 30 may be either purified water, water from a municipal water system or other source of water. The water supply hardness and concentration of dissolved solids by definition determines the water available for an evaporation and cooling duty. This is because of the physical laws and properties governing concentration of dissolved solids in water and the relationship of these concentrations to media scaling. Several indices have been developed and tested experimentally that correlate scaling to levels of concentration and composition of the dissolved chemicals in the water. These include the Langelier Saturation Index, the Ryznan Stability Index, the Puckorius Scaling Index and others.

A solenoid valve or ball valve 32 controls the flow of water into evaporative control system 10 and ensures that water inflow only occurs during operation of the system; various shut off controls may be incorporated to ensure cessation of water flow in the event of malfunction of one or another component. The flow rate of water is controlled by a constant volume control valve or pressure regulating valve 34. This combination of valving and orifice sizing ensures that a predetermined flow rate of water is distributed to the unit 14 irrespective of the input pressure fluctuations that normally occur with respect to any municipal water system as a function of changing demands over the course of the day. One of the factors affecting evaporation of the water present in media 12 is the temperature of the water therein. Accordingly, a temperature sensor 36 to sense the temperature of the water flowing to media 12 via water distribution unit 14 is embodied.

If the water distribution is not uniform in all three media dimensions (across the media and from top to bottom), or if the water flow rate down through the media is insufficient, there will be areas where the cycles of concentration will be higher or in the extreme and media will be dry. At each such spot, dissolved solids will tend to precipitate out and scale will be formed. Subsequent wetting will not redissolve the solids and media performance will be compromised. Even with uniform flow, the various variables that impact evaporation on the media and impact the wetting of the media must be managed effectively to ensure that no media dry spots or scaling occurs. To achieve this end, numerous sensors are employed. Sensor 40 senses the temperature of the air flowing into media 12 and sensor 42 senses the temperature of the air flowing from the media. Sensor 44 senses the relative humidity of the air flowing into the media and sensor 46 senses the relative humidity of the air flowing from the media. Sensor 48 senses the pressure upstream of media 12 and sensor 50 senses the pressure downstream from the media and thereby a differential pressure can be determined, as representatively illustrated by line 52.

The rate of air flow through media 12 may be varied in response to varying climatological conditions to ensure highest efficiency of system 10 and the greatest temperature differential between the air flowing into and out of the media. To permit varying the rate of air flow generated by fan 20, a sensor 60 is used to sense the speed of the fan and a relay 62 may be used to control operation of the fan. Similarly, a pressure sensor 64 within the evaporative cooler unit senses the pressure therein and in combination with sensor 66 sensing the pressure of the environment into which the cooled air is discharged provide an indication of the differential pressure.

Figure 2:
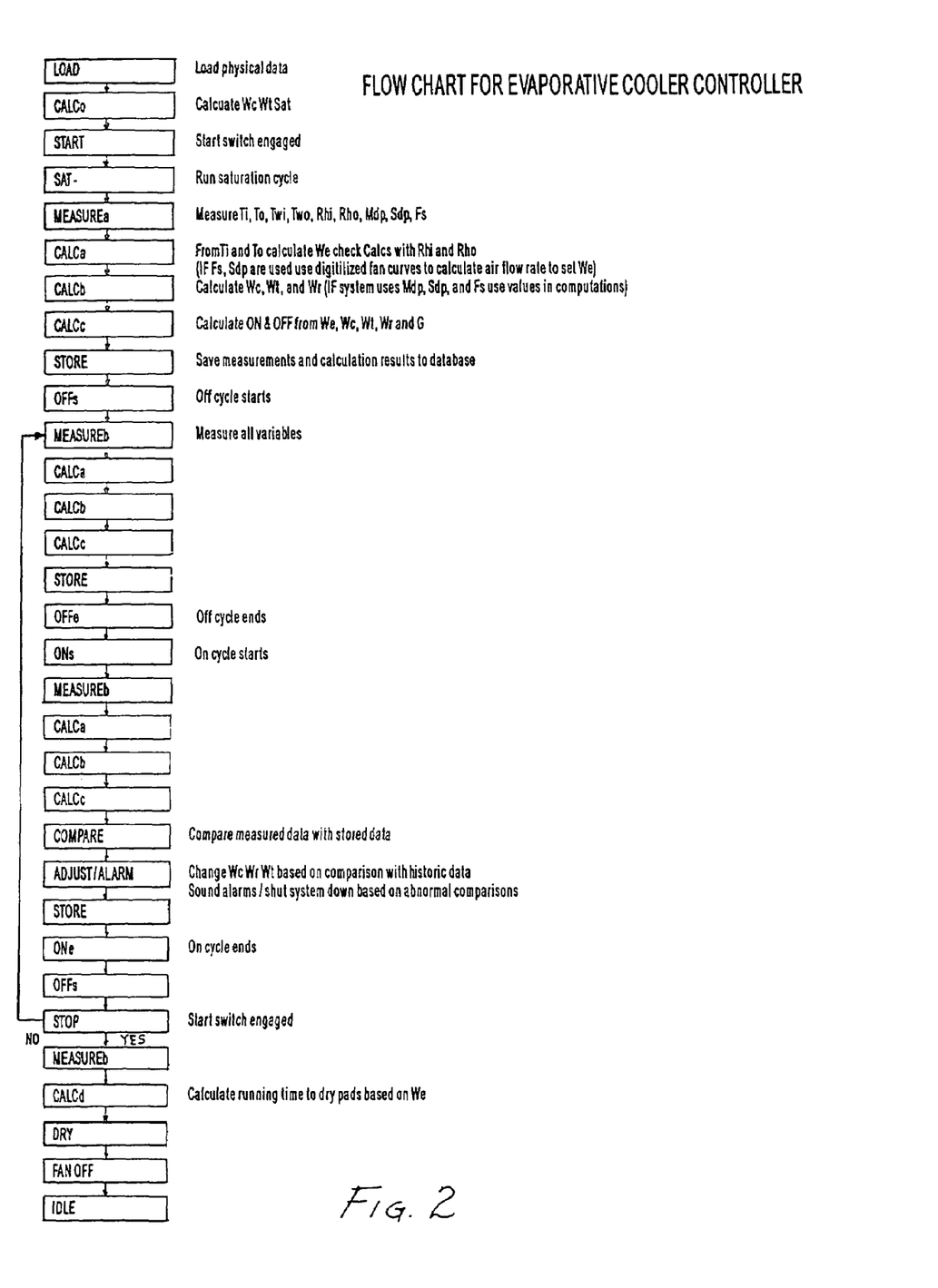
FIG. 2 is a flow chart of the functions performed by a microprocessor controlling operation of the evaporative cooler.
Figure 2A:
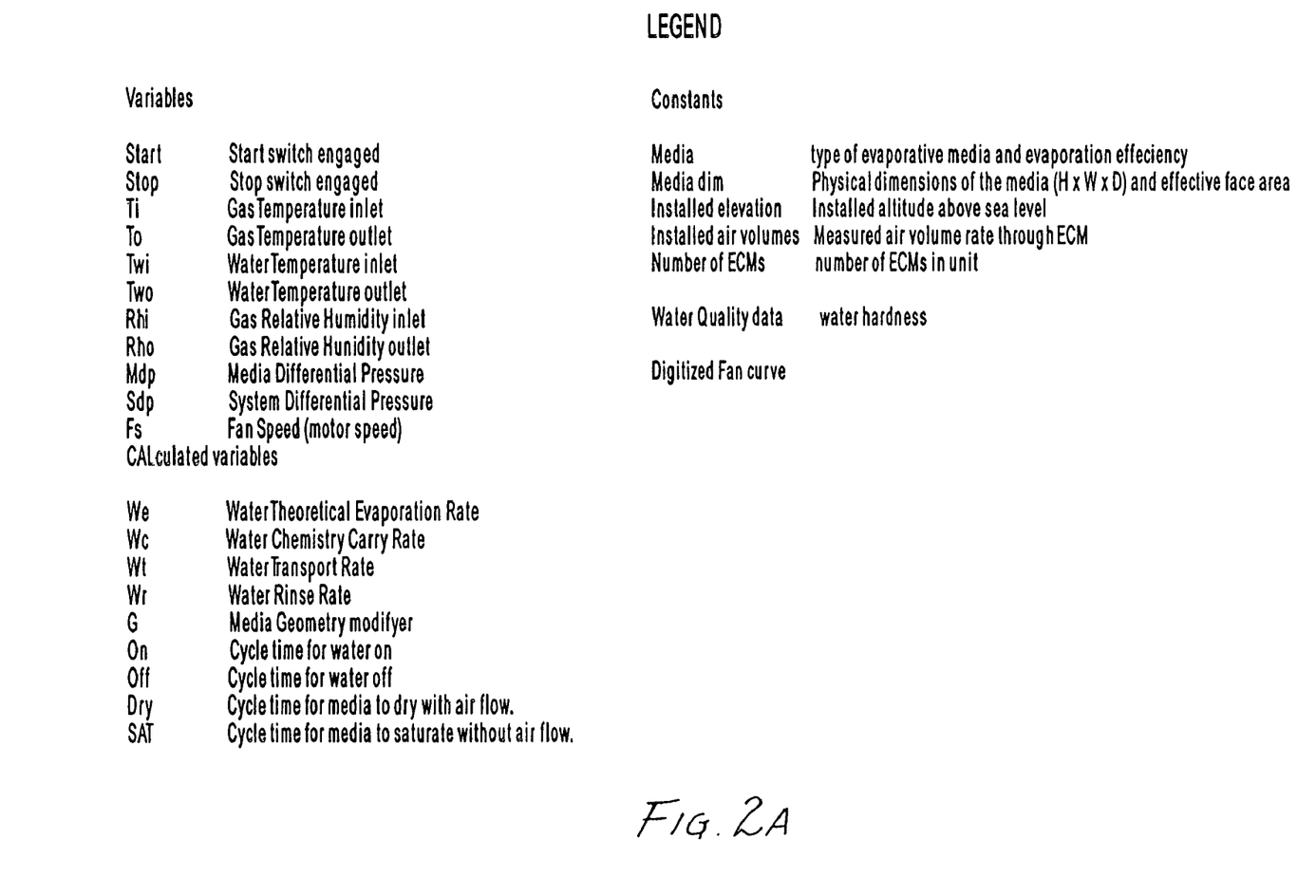
FIG. 2A is a legend for the abbreviations set forth in the flow chart shown in FIG. 2.
Figures 3A, 3B, 3C:
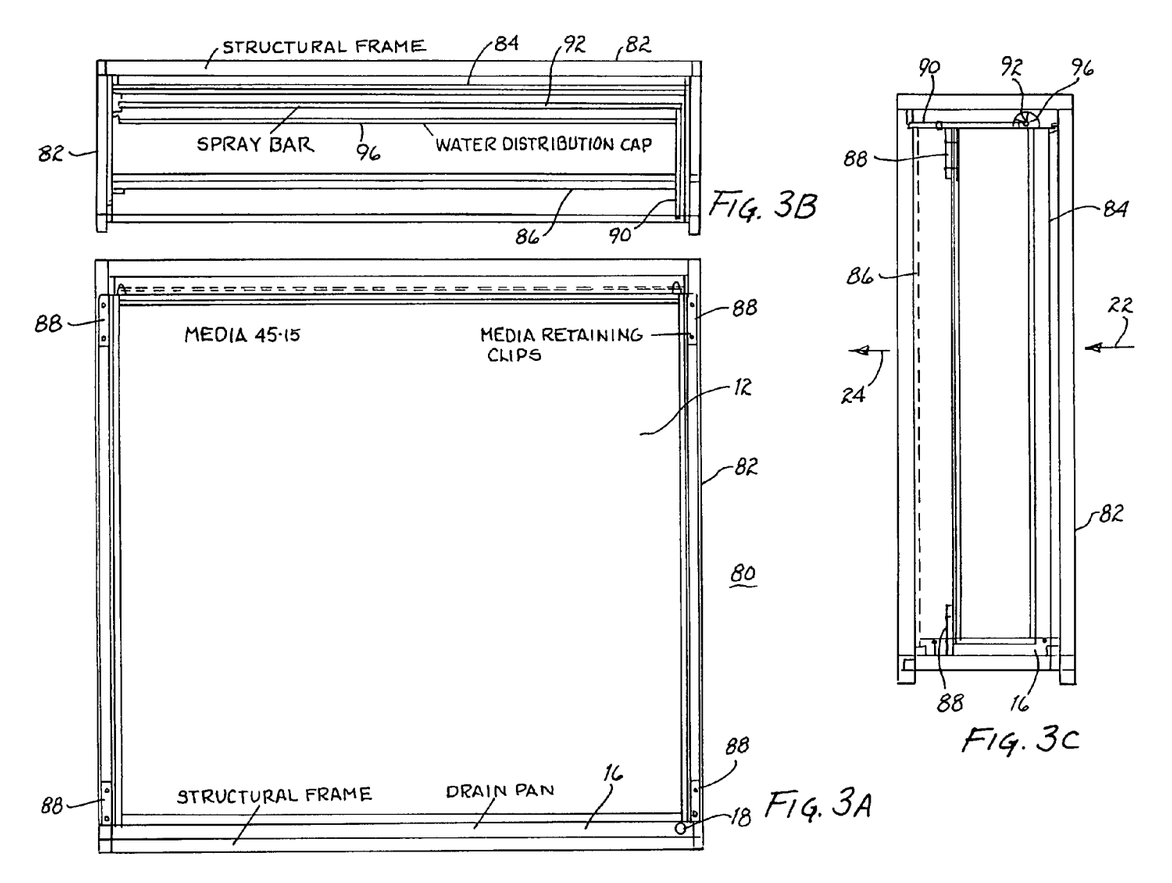
FIGS. 3A, 3B and 3C illustrate the front, top and side views of structure surrounding the media of an evaporative cooler and representing a media module.
Figure 4:
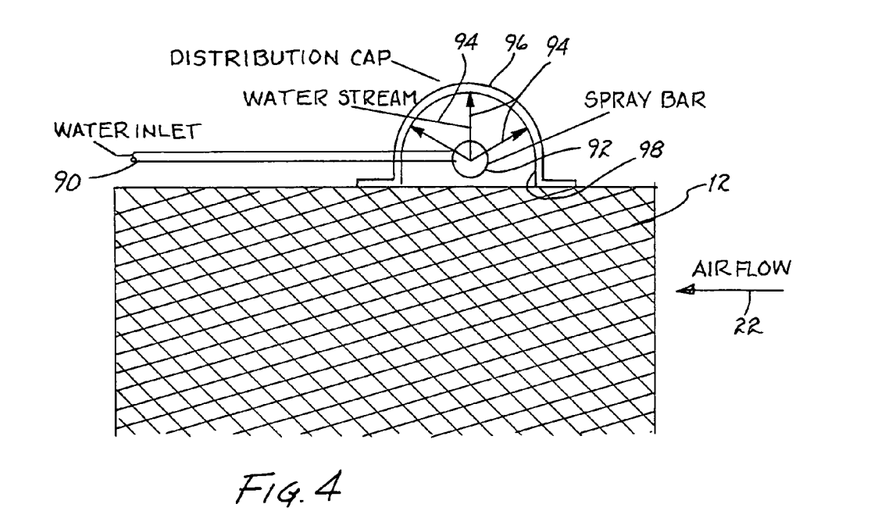
FIG. 4 is a partial cross sectional view illustrating the water manifold and related structure mounted on top of the media.

The above described sensors are interconnected with a microprocessor 70 that receives electrical signals from the sensors. Upon processing the data represented by each of these electrical signals, control signals are generated to control not only the water flow to water distribution unit 14 but also the rate of flow. Similarly, the speed of fan 20 may be controlled to provide an air flow rate through media 12 that will optimize operation of the evaporative cooler. Referring to FIGS. 2 and 2A, there is shown a flow chart representing the operation of microprocessor 70 along with a legend for the terms in the flow chart. As this flow chart is self explanatory, it need not be paraphrased herein.

Referring jointly to FIGS. 3A, 3B, 3C, 4 and 5, the structure and operation of a single media module 80 will be described. A frame 82 surrounds a media 12 to ensure that the air inflow, as represented by arrow 22, is through front side 84 of the media and that the outflowing cooled air, as represented by arrow 24, is through back side 86 of the media. Additionally, it supports the media through clip 88, or the like, interconnecting frame 82 with media 12; other mechanisms for retaining the media within the frame may also be used. A drain tray 16 is mounted at the bottom of frame 82 to receive the water that will drip from media 12. The water collected in the drain tray is discharged through drain 18. As particularly shown in FIGS. 4 and 5, water, from a source of water, is introduced through a pipe 90 and conveyed to a spray bar 92. Water spray from the spray bar is directed upwardly any/or at different angles, as represented by arrows 94. The sprayed water impacts a distribution cap 96. The distribution cap is in the nature of an inverted trough mounted on or in proximity to media 12 and supported by frame 82. The role of this distribution is to transform the jets of water exiting the spray bar to a more uniform pattern of water at the top of the media. Some of the water will drip directly from the distribution cap onto media 12 while the remaining water will flow downwardly along the interior sides of the distribution cap and drip or flow onto the media. Multiple baffles or inverted troughs may be used in combination with multiple spray bars or spray bars with multiple rows of uniquely positioned holes to achieve the desired pattern of water distribution at the top of the media. Thereby, the water sprayed from spray bar 92 is distributed upon media 12 along an area approximately equivalent to downward opening 98 of the distribution cap or caps.

Figure 5:
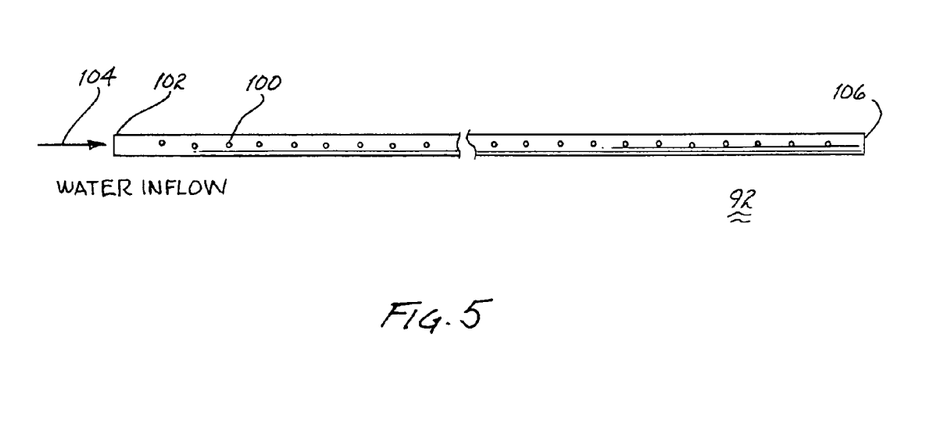
FIG. 5 illustrates a water manifold with the discharge holes located therein.

One of the problems attendant the water distribution system of existing evaporative coolers relates to non uniform distribution of water upon the media. That is, the distribution of water along a spray bar or the like is generally in a diminishing volume from the inlet end to the closed end of the spray bar. Furthermore, the rate of discharge along the spray bar is generally a function of variations in pressure of the inflowing water from a municipal water system or other water source; it is well known that such pressure varies during any given 24 hour period. It has been learned that a spray bar 92 constructed in accordance with the present invention provides a uniform volumetric discharge from each of apertures 100 extending from inlet end 102 to closed end 106, which does not exceed +/−10% variation along the spray bar. With such uniformity of water discharge, the water distribution in the media is within a four percent (4%) tolerance.

When multiple media modules are used the tolerance or variation between wetted media does not vary more than five percent (5%). The water inflow is represented by arrow 104. To achieve these results, apertures 100 are formed with a tolerance of +/−2.4% uniformly spaced along the spray bar. Furthermore, the total area of apertures 100 is established as less than 25% of the internal cross sectional area of the spray bar. Additionally, the total area of apertures 100 is less than that calculated using D'Arcy formula to yield a resultant spray bar pressure greater than one to five psi when the rate of flow is controlled to that of the desired media wetting rate. In the embodiment illustrated in FIG. 5, a typical spray bar may be 69½ inches long with the aperture at each end being located approximately 1 inch from the respective end. Fifty-five apertures are disposed in a line in the spray bar spaced apart from one another at 1¼ inch intervals. For a spray bar having a ¾ inch inside diameter, each aperture would be sized to have a diameter of fifty thousandths of an inch (0.050"). These dimensions meet the criteria of the apertures collectively having an area no greater than 25% of the internal cross sectional area of the spray bar. In applications where there is a desire to shift the profile of water distribution in the media to one more heavily loaded to the front of the media, an additional row of apertures oriented toward the front of the media may be incorporated into the design.

Figure 6:
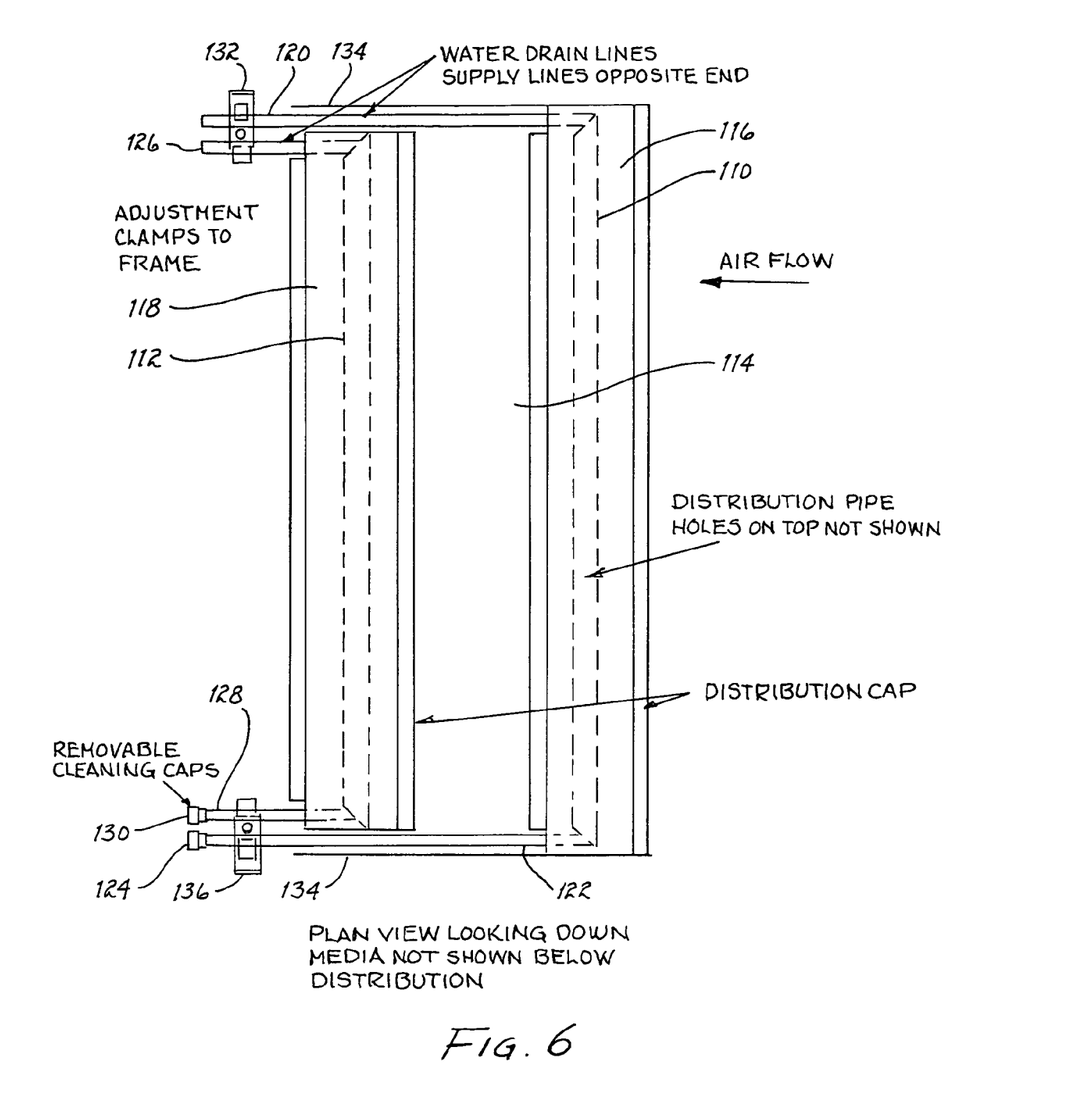
FIG. 6 is a schematic of a top view illustrating a pair of manifolds formed as part of the water distribution system for distributing water to the top of a media.

Referring to FIG. 6, there is illustrated an embodiment of the water distribution system incorporating two spray bars 110, 112 mounted above media 114. A distribution cap 116 is disposed above spray bar 110 and a further distribution cap 118 is disposed above spray bar 112. A conduit or pipe 120, in fluid communication with a source of water, provides an inflow of water to spray bar 110. At the other end of the spray bar, a further pipe 122 is capped by a cap 124 and is used primarily for the purpose of providing a clean out of the spray bar from time to time. A pipe 126 in fluid communication with a water source provides water to spray bar 112. A pipe 128, which is capped by cap 130, is in fluid communication with the other end of spray bar 112 and is used primarily for clean up purposes of the spray bar. A clamp 132, or the like, may be used to secure pipes 120, 126 to the frame, which is representatively identified by numeral 134. Similarly, a clamp 136 or the like, may be used to attach and secure pipes 122, 128 to the frame, again representatively identified by reference numeral 134.

As some installations may best be served by providing a media 114 which may be too wide to receive and distribute adequate water across the top of the media in a uniform manner, a pair of spray bars, as described above and illustrated in FIG. 6 would be used. Necessarily, the locations of the spray bars, and their corresponding distribution caps, would be a function of the width of the media as well as the width of the respective distribution caps in order to uniformly distribute water across the top of the media.

Figure 7:
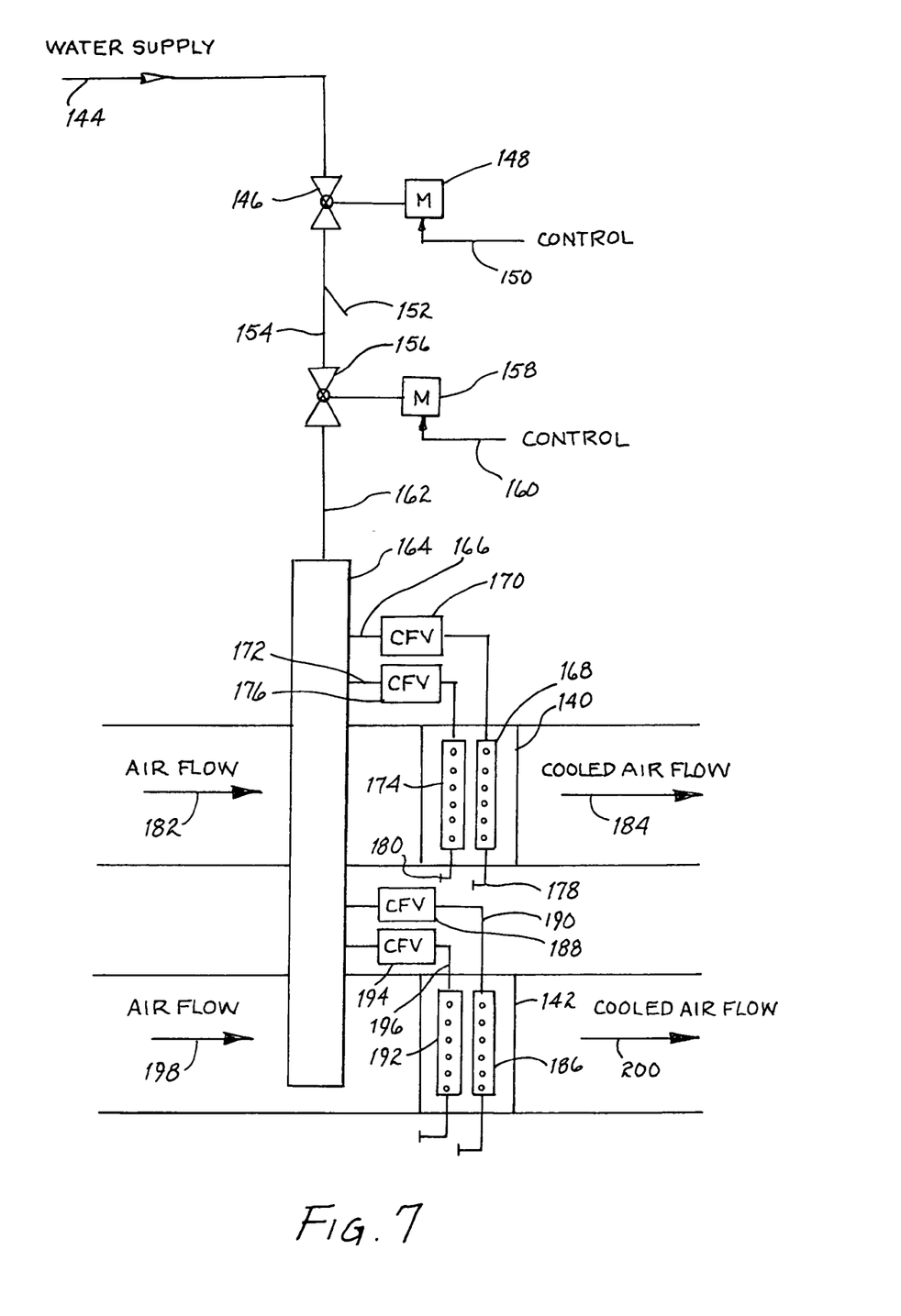
FIG. 7 is a schematic of the water delivery and distribution system useable with one or more evaporative coolers.

Referring to FIG. 7, there is shown a schematic of an evaporative cooler system embodying a plurality of media modules, of which two are shown and identified by reference numerals 140, 142. A source 144 of water, whether from the local municipality, a source of purified water or other source, provides water to a ball valve 146. The valve is a spring return valve operated by a motor 148 or other actuator under control of a control signal identified by numeral 150. Because valve 146 is a spring return valve, it will provide a fail safe operation to terminate the flow of water unless motor 148 or other actuator operates to retain it in an open state in response to the control signal. A constant flow valve(s) is preferred to eliminate the likelihood of water hammer. Downstream of valve 146 there may be located a Wye strainer 152 connected to conduit 154 leading to a further ball valve 156. The ball valve controls the flow of water to the water distribution system attendant media modules 140, 142, etc. It is controlled by a motor 158 which receives control signals, as represented by numeral 160. An actuator of some type other than motor 158 may be incorporated.

Conduit 162 conveys water from valve 156 to a water manifold 164. A conduit 166 provides a flow of water to spray bar 168, as described above, through a constant flow valve 170. Similarly, a conduit 172 provides water from the manifold to spray bar 174 through a constant flow valve 176. As described above, spray bars 168, 174 may include clean out conduits 178, 180 for periodic maintenance purposes. Thereby, spray bars 168, 174, provide water to wet the media in media module 140 and maintain the media wetted throughout operation of the evaporative cooler. With such wetting of the media, the air flow entering the media module, as represented by arrow 182, will be cooled as it passes through the media module, as represented by arrow 184. Similarly, spray bar 186 of media module 142 receives water from manifold 164 via constant flow valve 188 and conduit 190. Spray bar 192 receives water from the manifold via constant flow valve 194 and conduit 196. The water discharged from spray bars 186, 192 will wet the media module 142 to cool the air flowing into the media module, as represented by arrow 198 to provide cooled air flow, as represented by arrow 200. It is to be understood that any number of additional media modules operatively connected to water manifold 164 may be incorporated to meet the in situ requirements at the facility wherein the evaporative cooler system is located.

Figure 8:
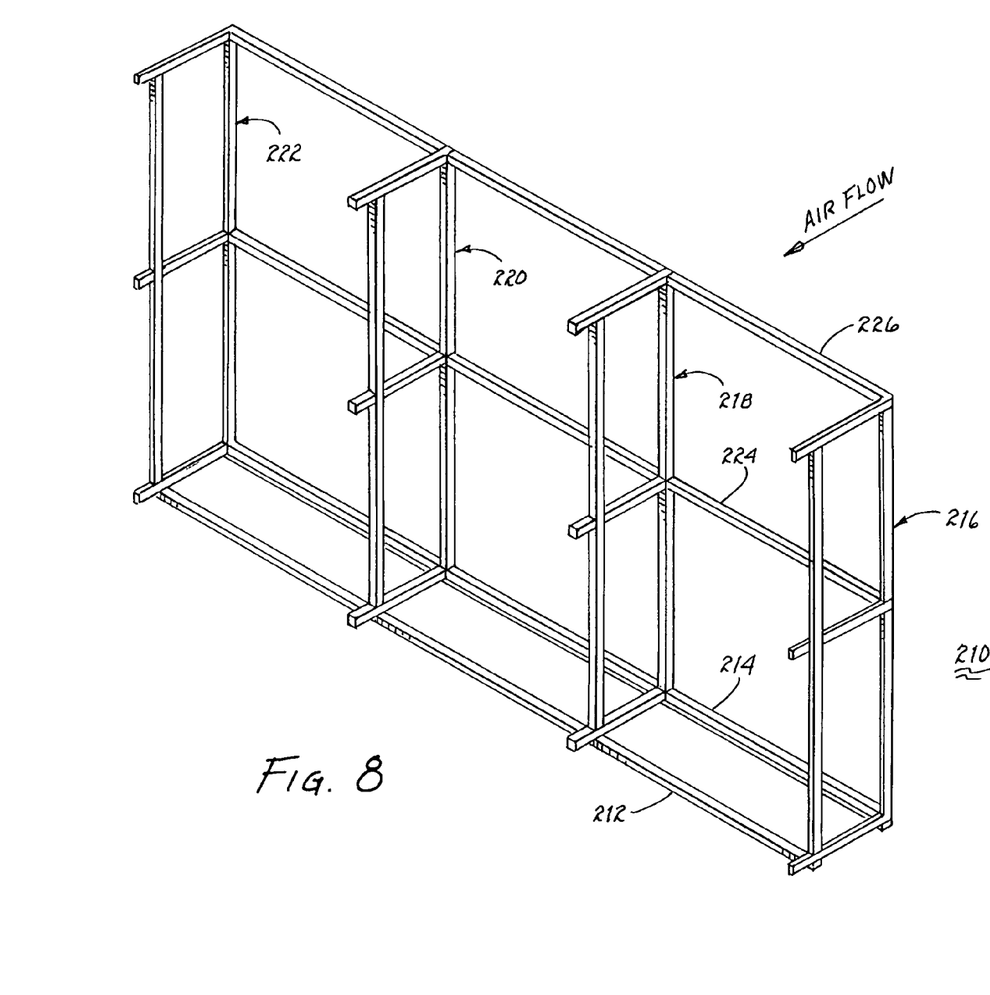
FIG. 8 is a representative prospective view of a framework for mounting a plurality of media modules.
Figure 9A:
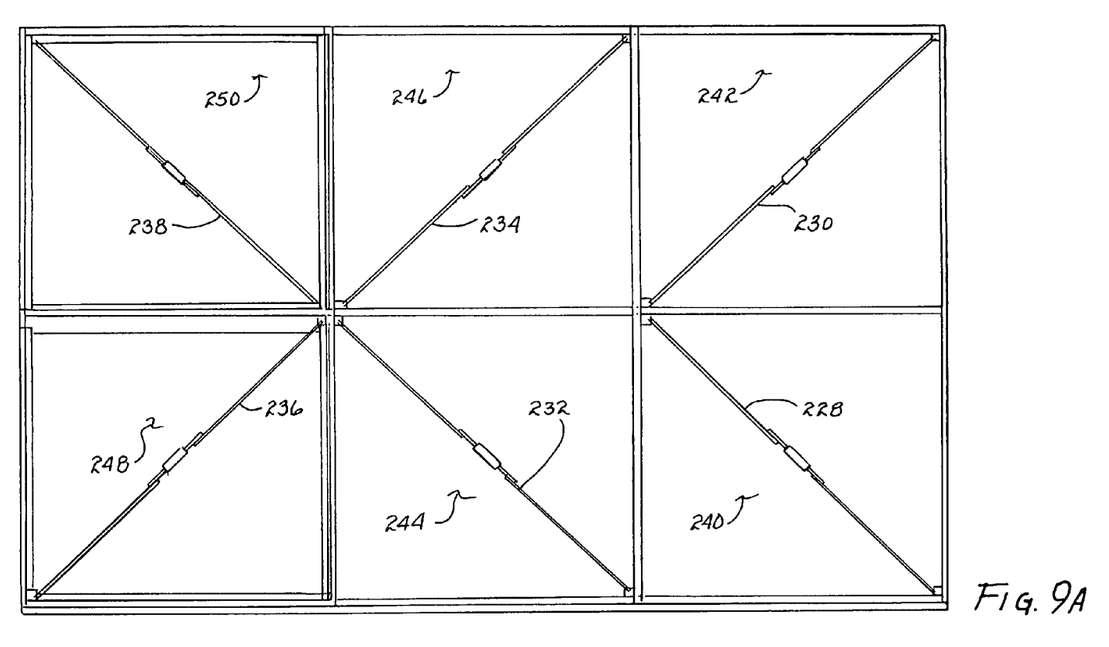
FIGS. 9A and 9B illustrate the front and top views of the framework for supporting multiple media.
Figure 9B:
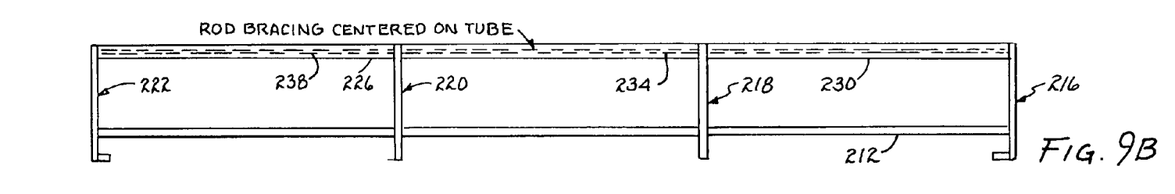

Referring jointly to FIGS. 8, 9A and 9B, there is shown a framework 210 for mounting and supporting a plurality of media that will provide cooled air as a result of the air moving through the wetted media. The framework includes a pair of base longerons 212, 214 supporting a plurality of upright members 216, 218, 220 and 222. These upright members are joined to one another and receive support from horizontal longerons 224, 226. As particularly shown in FIGS. 9A and 9B, stability and rigidity of the defined squares or rectangles is achieved by rods 228, 230, 232, 234, 236 and 238 in tension and engaging diagonally opposed corners of spaces 240, 242, 244, 246, 248 and 250, respectively. To prevent interference with the media to be placed within each of the spaces, the rods extend between and are centered on the respective longerons defining the spaces. The impediment to air flow into the contained media by the cross sectional area of the respective rods is essentially inconsequential for all practical purposes. It is to be understood that the dimensions of spaces 240, 242, 244, 246, 248 and 250 may vary from space to space as a function of the air flow requirements and practical considerations of the media, the water distribution system, water drainage, and other structural requirements.

Figure 10A:
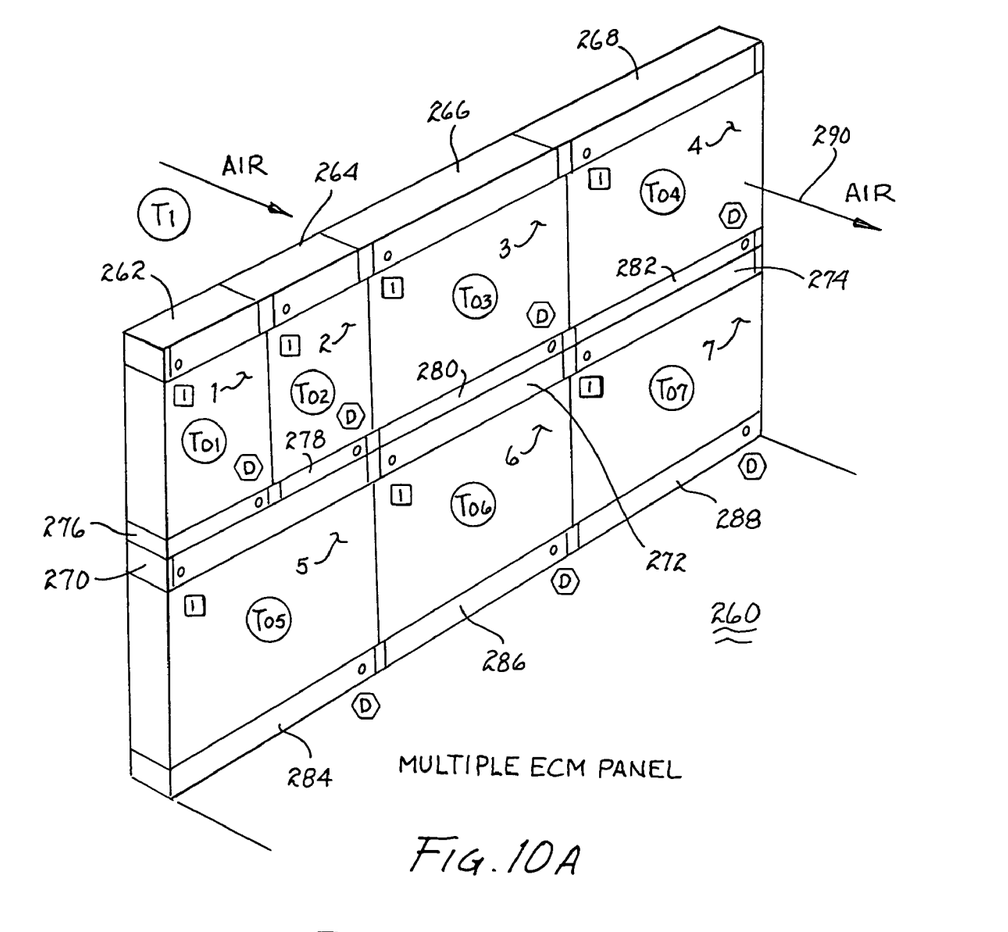
FIG. 10A is a representational view of an evaporative cooler having a plurality of media modules.
Figure 10B:
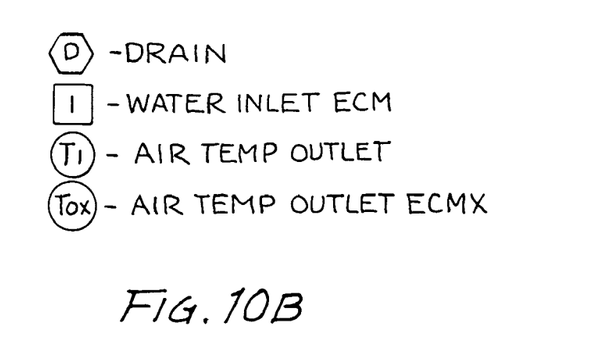
FIG. 10B is a legend for the symbol shown in FIG. 10A.

FIG. 10A, coupled with the legend set forth in FIG. 10B, illustrates a plurality of media modules mounted in a framework such as or a variation of framework 210 shown in FIGS. 8, 9A and 9B. Evaporative cooling system 260 includes a plurality of media modules identified by numerals 1, 2, 3, 4, 5, 6 and 7. Each of these modules includes a water inlet for providing water to the respective water distribution unit 262, 264, 266, 268, 270, 272 and 274. Each of these water distribution units may include one or more spray bars, etc. as discussed above. Each media module also includes its own drain tray 276, 278, 280, 282, 284, 286 and 288. As illustrated, media modules 1 and 2 may each be approximately half the size of the remaining modules; thereby, it is illustrated that differently sized media modules may be combined or used for specific air flow purposes and requirements.

As illustrated, the air to be cooled enters, as identified by T1. The cooled air flowing out from each media module is identified by $T_o1$, $T_o2$, $T_o3$, $T_o4$, $T_o5$, $T_o6$ and $T_o7$ and collectively identified by arrow 290.

A primary benefit of using a plurality of individual modules at a location wherein a significant volume of air is to cooled is that of optimizing the size and configuration of each module for maximum efficiency and effectiveness. For example, to provide a media module that were on the order of 8 by 12 feet would be extremely difficult and expensive without compromising efficiency and effectiveness. Furthermore, in the event of breakdown or deterioration of any component of any of the multiple modules, the corresponding module is easily and relatively inexpensively replaced without affecting or requiring any repair/maintenance to the remaining modules. In contradistinction, to repair/replace a component of a huge media module would be expensive, time consuming and prevent use of the evaporative cooler system during such repair/maintenance. It may be noted that in the event a repair/maintenance of a particular media module is delayed or deferred for some reason, the remaining media modules are capable of fully functioning and will continue to provide cooled air.

We claim:

1. In an evaporative cooler system having a source of water, a media module, a water distribution system for distributing water along the top of the media, a device for causing air flow through the media module to evaporate the water flowing therethrough and cool the air, a sump and a drain for draining water from the sump, the improvement comprising in combination:
    a) a spray bar in fluid communication with the source of water, said spray bar having an internal cross sectional area;
    b) a constant flow valve for controlling the flow of water to said spray bar; and
    c) a plurality of holes disposed in said spray bar for discharging water onto the media module, said plurality of holes defining, in the aggregate, an area equivalent to or less than twenty five percent (25%) of the internal cross sectional area of said spray bar.

2. An evaporative cooler system as set forth in claim 1 wherein said plurality of holes are equally spaced along said spray bar.

3. An evaporative cooler system as set forth in claim 1 including a distribution cap for distributing water from said spray bar onto the media module.

4. An evaporative cooler system as set forth in claim 3 wherein said distribution cap includes an inverted trough disposed above said spray bar and wherein said plurality of holes are oriented to spray water at selected angles to impinge upon said distribution cap to achieve a desired water distribution.

5. An evaporative cooler system as set forth in claim 1 including:
    a) a further spray bar in general alignment with said spray bar;
    b) a further constant flow valve for controlling the flow of water to said further spray bar; and c) a further plurality of holes disposed in said further spray bar for discharging water onto the media module, said further plurality of holes defining in the aggregate an area equivalent to or less than twenty five percent (25%) of the internal cross sectional area of said further spray bar.

6. An evaporative cooler system as set forth in claim 5 wherein said plurality of holes and said further plurality of holes are equally spaced along said spray bar and said further spray bar, respectively.

7. An evaporative cooler system as set forth in claim 5 including a distribution cap and a further distribution cap for distributing water from said spray bar and said further spray bar, respectively, onto the media module.

8. An evaporative cooler system as set forth in claim 7 wherein each of said distribution cap and said further distribution cap includes an inverted trough disposed above said spray bar and said further spray bar, respectively, and wherein said plurality of holes and said further plurality of holes are oriented to spray water at selected angles to impinge upon said distribution cap and said further distribution cap, respectively, to achieve a desired water distribution.

9. An evaporative cooler system as set forth in claim 1 including first and second sensors for sensing the temperature and humidity, respectively, of the air drawn into the media module, third and fourth sensors for sensing the temperature and humidity, respectively, of the air drawn from the media module, a microprocessor responsive to said first, second, third and fourth sensors for controlling the constant flow valve and the air flow through the media.

10. An evaporative cooler system as set forth in claim 9 including a fifth sensor for sensing the speed of the air flow and a sixth sensor for sensing the media differential pressure, said controller being responsive to said fifth and sixth sensors.

11. An evaporative cooler system as set forth in claim 10 including a seventh sensor for sensing the pressure differential of the air flow upstream and downstream of the media, said controller being responsive to said seventh sensor.

12. An evaporative cooler system, said system comprising in combination:
   a) a source of water;
   b) a media module;
   c) a device for drawing air through said media module;
   d) a water distribution unit in fluid communication with said source of water for distributing water onto said media module;
   e) a sump for collecting water from said media module and including a drain for draining the collected water;
   f) said water distribution unit including a spray bar having a plurality of holes for discharging streams of water, said plurality of holes defining in the aggregate an area equivalent to or less than twenty five percent (25%) of the internal cross sectional area of said spray bar; and
   g) a distribution cap for diverting the streams of water onto said media module.

13. An evaporative cooler system as set forth in claim 12 including a constant flow valve for controlling the flow of water from said source of water to said spray bar.

14. An evaporative cooler system as set forth in claim 13 wherein said water distribution unit includes a further spray bar, having a further plurality of holes for discharging further streams of water, said further plurality of holes defining in the aggregate a further area equivalent to or less than twenty five percent (25%) of the internal cross sectional area of said further spray bar, and a further distribution cap for diverting the further streams of water onto said media module.

15. An evaporative cooler system as set forth in claim 13 including first and second sensors for sensing the temperature of the air flowing onto said media module and for sensing the temperature of the air drawn from said media module, respectively, and a controller for controlling the flow of water from said constant flow valve and the speed of the air flow in response to said first and second sensors.

16. An evaporative cooler system as set forth in claim 15 including third and fourth sensors for sensing the relative humidity of the air flowing into said media module and for sensing the relative humidity of the air drawn from said media module, respectively, said controller being responsive to said third and fourth sensors.

17. An evaporative cooler system as set forth in claim 16 including a fifth sensor for sensing the speed of the air flow, said controller being responsive to said fifth sensor.

18. An evaporative cooler system as set forth in claim 16 including a pressure differential sensor for sensing the pressure differential across said media module, said controller being responsive to said pressure differential sensor.

19. An evaporative cooler system as set forth in claim 15 including a water temperature sensor for sensing the temperature of the water flowing to said spray bar, said controller being responsive to said water temperature sensor.

20. An evaporative cooler system as set forth in claim 15 including a differential pressure sensor for sensing the difference in pressure between the air downstream of said media module and the air downstream of said device, said controller being responsive to said differential pressure sensor.

21. An evaporative cooler system as set forth in claim 12 including at least one further media module to form an array of at least two media modules, each of said further media modules including:
   a) a further water distribution unit in fluid communication with said source of water for distributing water onto said further media module;
   b) a further sump for collecting water from said further media module and including a further drain for draining the collected water;
   c) each of said further water distribution units including a further spray bar having a plurality of further holes for discharging further streams of water, said further plurality of holes defining in the aggregate an area equivalent to or less than twenty five percent (25%) of the cross sectional area of said further spray bar; and
   d) a further distribution cap for diverting the further streams of water onto said further media module.

22. A method for operating an evaporative cooler system, said method comprising the steps of:
   a) providing a source of water;
   b) drawing air through a media module with a device;
   c) distributing water from the source of water to the media module;
   d) collecting water draining from the media and draining the collected water;
   e) said step of distributing including the step of discharging a plurality of streams of water from a spray bar having a plurality of holes of an aggregate area equivalent to or less than twenty five percent (25%) of the cross sectional area of the spray bar; and
   f) diverting the streams of water with a distribution cap onto the media module.

23. The method as set forth in claim 22 including the step of:
   a) sensing the temperature of the air flowing into and out of the media module; and
   b) controlling the flow of water distributed to the media module with a controller responsive to said step of sensing.

24. The method as set forth in claim 23 including the steps of:
   a) further sensing the relative humidity of the air flowing into and out of the media module;
   b) further controlling the flow of water distributed to the media module with the controller in response to said step of further sensing.

25. The method as set forth in claim 24 including the steps of:
   a) yet further sensing the differential pressure across the media module; and
   b) yet further controlling the flow of water distributed to the media module with the controller in response to said step of yet further sensing.

26. The method as set forth in claim 23 including the steps of:
   a) determining the temperature of the water flowing to the media module; and
   b) regulating the flow of water distributed to the media module with the controller in response to said step of determining.

27. The method as set forth in claim 23 including the steps of:
   a) determining the speed of the air flow urged by the device; and
   b) controlling the speed of the device with the controller in response to said step of determining.

28. The method as set forth in claim 23 including the steps of:
   a) determining the differential pressure of the air downstream of the media module and the air downstream of the device; and
   b) controlling the flow of water distributed to the media with the controller in response to said step of determining.

29. The method as set forth in claim 22 including an array of a plurality of media modules and repeating each of steps a), b), c), d), e), and f) for each media module.

30. The method as set forth in claim 29 including the steps of:
   a) sensing the temperature of the air flowing into and out of the array of media modules; and
   b) controlling the flow of water to the media modules with a controller responsive to said step of sensing.

* * * * *